INVENTOR
Raymond J. Mayotte
by Horton, Davis, Brewer & Brugman
Atty's

United States Patent Office 3,228,445
Patented Jan. 11, 1966

3,228,445
TRAILER HITCH BALL COVERS
Raymond J. Mayotte, Box 291, Escanaba, Mich.
Filed Mar. 12, 1964, Ser. No. 351,304
1 Claim. (Cl. 150—52)

This invention relates in general to vehicles, and more particularly to a cover for enclosing the ball of a vehicle trailer hitch when the latter is not in use.

The usual arrangement for securing a trailer to a passenger car or truck is by means of a detachable coupling or hitch which comprises a cupped portion attached to or forming a part of the towed vehicle or a tow bar, and a substantially spherical stud or ball fastened to or mounted on a part of the towing vehicle. In use, the cupped portion fits over the ball and is retained in pivotal engagement therewith by a suitable latch or pawl. The relative pivotal movement between the cupped portion and the ball of the hitch during use requires lubrication, and the material which is most satisfactory and generally used for this purpose is lubricating grease.

Consequently, when the hitch is not in use and the cupped portion is separated from the ball, the latter is exposed and presents a dirt hazard to anyone or anything coming into contact with it.

At the same time, the greasy ball may readily accumulate dust and sand, or other dirt, or the grease may be wiped off, which will present a resulting driving hazard during subsequent use, since a rusty, dirty or ungreased trailer hitch ball easily can cause binding, heating and breakage of the coupling, particularly of the latching pawl.

Therefore, a principal object of this invention is to insure against any and all such undesirable results. This is accomplished by providing a cover for protecting the trailer hitch ball, when it is not in use, and for preventing the soiling of anything that may come in contact with it.

Another important object of the invention is the provision of such a trailer hitch ball cover which is cup-shaped, with an opening smaller in diameter than the ball, and which is made from a resilient or flexible material, so that it can be slipped over the ball and will retain itself thereon against accidental displacement or removal.

At the same time, it is necessary that the ball cover be grease resistant and able to withstand relatively extreme weather and temperature conditions. These characteristics, along with the required flexibility, are assured by making the cover from synthetic rubber, such as neoprene, preferably in the 60 to 70 Shore hardness range, or nitrile or polyurethane rubbers.

Another important object of the invention is to so construct such a trailer hitch ball cover that it will not wipe off or remove the grease from the ball while being mounted on or removed from it. This object is attained by providing vertically and radially extending ribs spaced from each other on the inner surface of the cup-shaped portion of the cover which are the only parts of the cover that come in contact with the greased surface of the hitch ball. These ribs are spaced from each other circumferentially of the ball and, being vertical, extend longitudinally in the direction of movement of the cover relative to the ball as it is placed over and removed from the ball.

A further object of the invention is to facilitate mounting of such a cover on a trailer hitch ball and removal of it therefrom and preventing its loss when not in use by providing outwardly extending tabs formed integrally with the cover, comprising oppositely disposed pull tabs near its base and a vertical tab at the top, with means preferably secured between the latter and the towing vehicle to limit movement of the cover and prevent its detachment from the vehicle when the trailer hitch is being used.

Numerous other objects and advantages of the invention will be apparent as it is better understood from the following description, which, when taken in connection with the accompanying drawings, discloses a preferred embodiment thereof.

Figure 4:
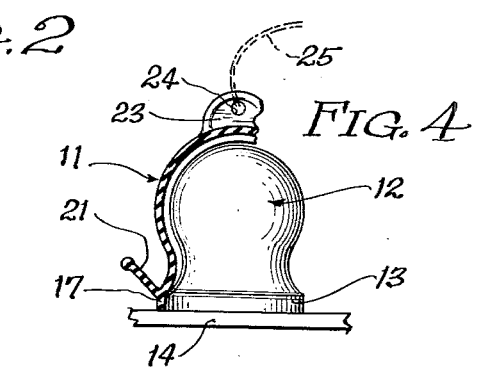
FIGURE 4 is an elevational view of a trailer hitch ball showing a portion of a cover mounted thereon.

Referring more particularly to the drawings, reference numeral 11 indicates in general a resilient cover of synthetic rubber which is adapted to be mounted upon a trailer hitch ball 12 when the latter is not in use. As best seen in FIGURE 4, the ball 12 is of standard configuration and may include a base portion 13 secured to, and mounted upon, a member 14 in any suitable manner, the latter forming a part of a towing vehicle.

In the preferred embodiment of the cover 11, the same comprises a substantially spherical hollow portion 15 terminating at its lower end in an open throat portion 16 curving downwardly and outwardly into an annular vertical flange 17. These several portions 15, 16 and 17 are molded or otherwise formed integrally with each other from synthetic rubber, such as neoprene, preferably in the 60 to 70 Shore hardness range, or nitrile or polyurethane rubbers. Such material is employed because, as will be understood more readily from the following description, it is required that the cover 11 be grease-resistant and sufficiently resilient to withstand having the throat portion 16 alternately stretched or expanded and released several thousand times.

Figure 1:
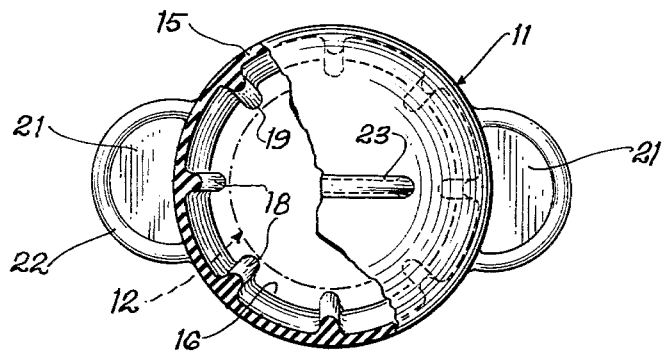
FIGURE 1 is a top plan view of a cover embodying the features of this invention, with a portion thereof in section to illustrate the interior rib construction.

Opposed vertical ribs 18 (FIGURES 1 and 2) are formed integrally with, and spaced peripherally of, said hollow spherical and throat portions 15 and 16, which conform substantially to the vertical sectional shape of those portions 15, 16, and extend inwardly from the inner surfaces thereof. There are three or more such ribs 18 provided, with eight being shown as employed in the illustrated embodiment.

The dimensioning of this cover 11 and the parts thereof hereinbefore described is dependent upon the dimensions of the trailer hitch ball 12 with which the cover is intended to be used. Standard sizes of such trailer hitch balls most commonly used are 2″ or 1⅞″ in diameter. The major portions of the ribs 18 disposed interiorly of the hollow spherical portion 15 define, with their inner edges, a spherical surface slightly greater in diameter than the ball 12 with which the cover 11 is to be employed. Therefore, when the cover is mounted on the ball, the inner surface of the spherical portion 15 is spaced from the ball a distance slightly greater than the radial thickness of the ribs 18.

Figure 2:
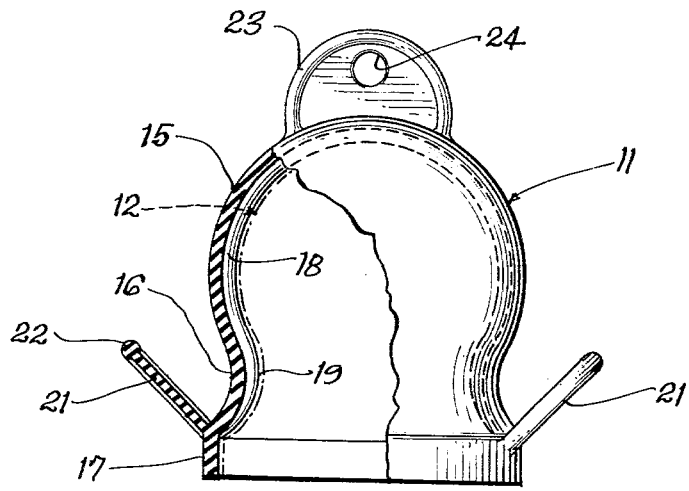
FIGURE 2 is a side elevational view of the cover of FIGURE 1, with a portion thereof shown in vertical section.
Figure 3:
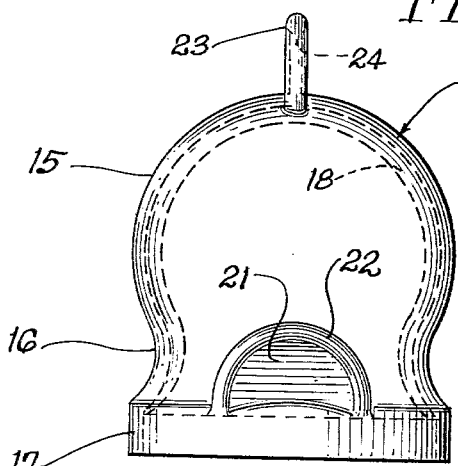
FIGURE 3 is an elevational view, as seen from the right side of FIGURE 2.

Adjacent the juncture of the hollow spherical portion 15 and the throat portion 16, the curvature of the lower portions of the ribs 18 is reversed, as at 19 in FIGURE 2, and from that point to its lower end, each of the ribs 18 is gradually reduced in thickness, or curves outwardly to a greater extent than the adjacent portion of the open throat 16. The lower ends of the ribs 18 blend into the vertical flange 17. The inner diameter of the latter is preferably somewhat greater than the outer diameter of the base portion 13 of the ball 12 with which the cover 11 is to be used, and the vertical height of the annular flange 17 preferably is slightly greater than that of the base portion 13.

Extending outwardly from points adjacent the juncture between the throat portion 16 and the annular flange 17 are diametrically opposed pull tabs 21 which are formed integrally with the cover 11. These tabs 21 extend outwardly and upwardly at any suitable angle, and preferably comprise a main body portion adapted to be grasped between the thumb and forefinger of an operator with an integral marginal flange or bead 22 to obviate tearing and facilitate such gripping of the tabs.

It readily will be appreciated, partially from a consideration of FIGURE 2, that if both of these opposed tabs 21 are grasped and pulled away from each other, the throat portion 16 of the resilient cover 11 may be expanded sufficiently to enable the inner periphery thereof to encompass and be drawn freely over the ball 12. The mounting of the cover 11 on, or the removal thereof from, the ball 12 thus will be facilitated and may be effected without wiping off or removing any grease disposed on the outer surface of the ball. In the event of the operator being physically incapable of thus stretching or enlarging the throat portion 16 of the cover 11 to enable the latter to be mounted on or removed from the ball without any engagement between the ball and the cover, such mounting or removing of the cover may be effected merely in response to vertical movement of the cover, either upwardly from its operative position on the ball or downwardly during its mounting on the ball, since only the reversely curved portions 19 of the ribs 18 will be in contact with the ball and such relative vertical movement will expand the throat portion 16 sufficiently to clear the ball.

It will be understood, of course, that in its operative position on the ball 12, as illustrated in FIGURE 4, the lower surface of the annular flange 17 preferably will rest upon the upper surface of the member 14 of the towing vehicle, while contact of the interior ribs 18 with the ball will be only substantially point-like adjacent their reversely curving portions 19. In any event, when so mounted in operative position on the ball 12, neither the inner surface of the hollow portion 15 nor the major portions of the ribs 18 of the cover 11 will be in contact with the ball, but the cover will effectively protect the trailer hitch ball, when the latter is not in use, and prevent the soiling of anything that might come in contact with it. At the same time, by virtue of the throat portion 16 having an open area with a periphery that is smaller than a great circle of the ball, the cover will be effectively retained on the ball against accidental displacement or removal. And by virtue of the above described configurations, and particularly the provision of the ribs 18, the coating of grease which is desired to be maintained on the ball will not be wiped or removed therefrom during mounting or removal of the cover. The ribs 18 have the further advantage of strengthening the hollow protecting portions 15, 16 and preventing fatigue failure in response to repeated expansions and contractions of the throat portion 16.

It will also be understood, of course, that when the trailer hitch is being used for its intended purpose, the cover 11 will not be in use. In order to prevent loss of the cover 11 under such circumstances, it is provided with an outwardly extending tab 23 formed integrally therewith and preferably extending upwardly therefrom. This tab 23 may be similar in configuration and construction to the pull tabs 21, but preferably is provided with an aperture 24 extending therethrough. Means, such as an anchoring lanyard 25 partially shown in broken lines in FIGURE 4, may be secured through this aperture 24 to the tab 23 at one of its ends and have its other end connected in any suitable manner to the member 14, or some other convenient portion of the towing vehicle, so as to limit movement of the cover and prevent its complete detachment from the vehicle when the trailer hitch is being used. Under such circumstances, if the operator does not wish to have the cover 11 merely dangling from the vehicle, the fact of its being made from synthetic rubber enables the cover to be tucked behind the bumper or in any other suitable space available without in any way damaging the vehicle or making any annoying noises. As an incidental feature, it will also be appreciated that known techniques permit of the cover 11 being given any desired color during the molding thereof.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

I claim:

A resilient cover of synthetic rubber for a trailer hitch ball, comprising a substantially spherical hollow portion terminating at its lower end in an open throat portion with a smallest horizontal inner diameter normally less than the diameter of the ball and curving outwardly into an annular vertical flange of a diameter greater than that of said spherical portion; a plurality of opposed vertical ribs formed integrally with and spaced peripherally of said spherical portion, conforming substantially to the vertical sectional shape of said spherical and throat portions, and extending inwardly from the inner surfaces thereof, with their major portions defining a spherical surface slightly greater in diameter than said ball; and diametrically opposed pull tabs formed integrally with and extending outwardly from said throat portion adapted to be pulled to move the cover relative to the ball and to expand said throat portion to enable the inner periphery thereof to encompass said ball to facilitate mounting of the cover on and removal of the same from the ball.

References Cited by the Examiner

UNITED STATES PATENTS

| 1,410,605 | 3/1922 | Schacht | 150—52 |
| 2,218,308 | 10/1940 | Comer. | |
| 2,573,552 | 10/1951 | Detzel | 215—41 |
| 2,714,912 | 8/1955 | Gonnella | 150—52 |
| 2,921,706 | 1/1960 | Johnson | 215—12 |

OTHER REFERENCES

Popular Science, Model Garage, August 1950, page 166.

JOSEPH R. LECLAIR, *Primary Examiner.*

J. F. McNULTY, *Assistant Examiner.*